Sept. 11, 1923.
W. A. STEVENS
1,467,958
POWER TRANSMISSION CONTROL
Filed Oct. 4, 1921
2 Sheets-Sheet 1
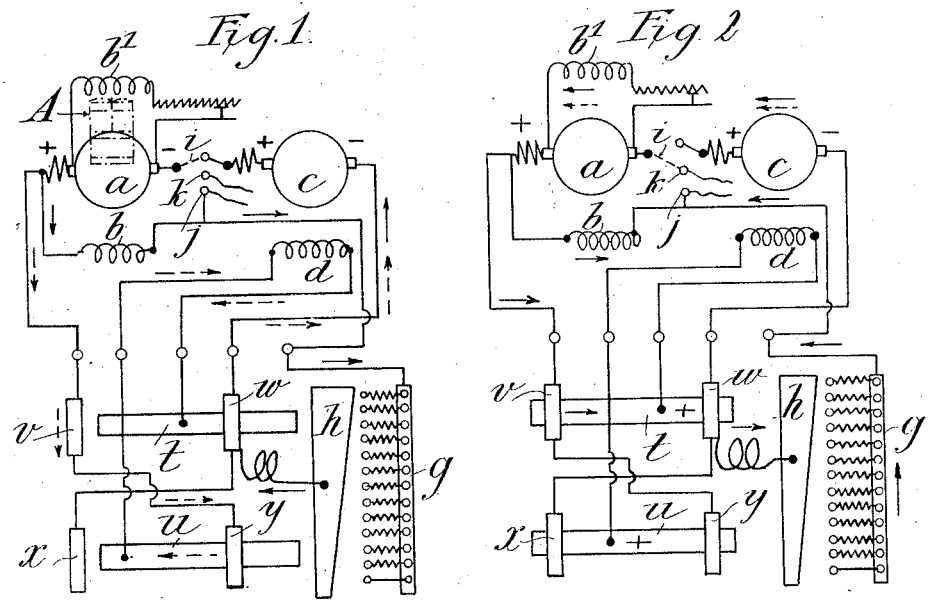
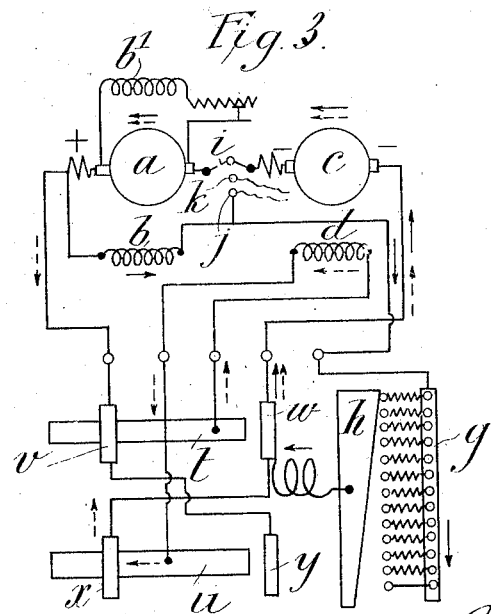
Inventor.
William A. Stevens
By Julius C. Dowell
his attorney Sept. 11, 1923.
W. A. STEVENS
POWER TRANSMISSION CONTROL
Filed Oct. 4, 1921
1,467,958
2 Sheets-Sheet 2
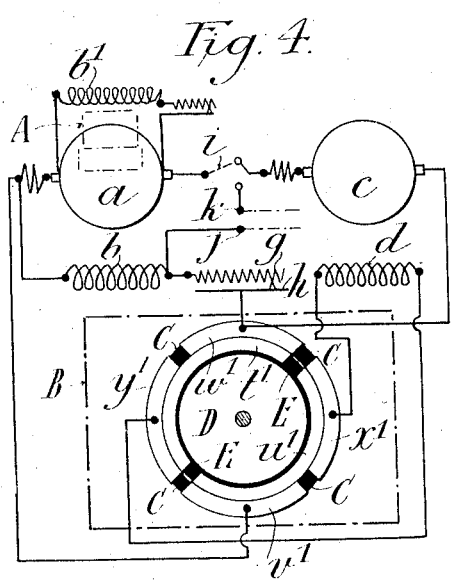
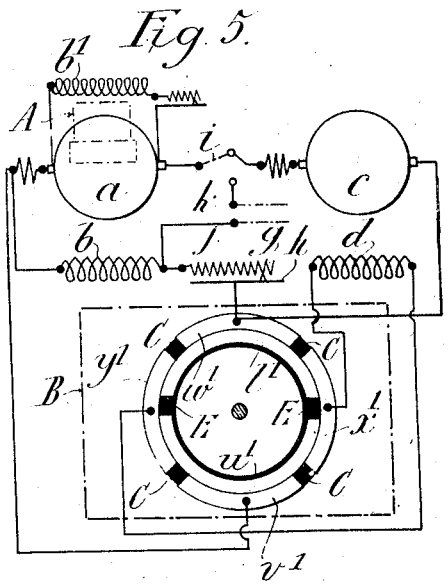
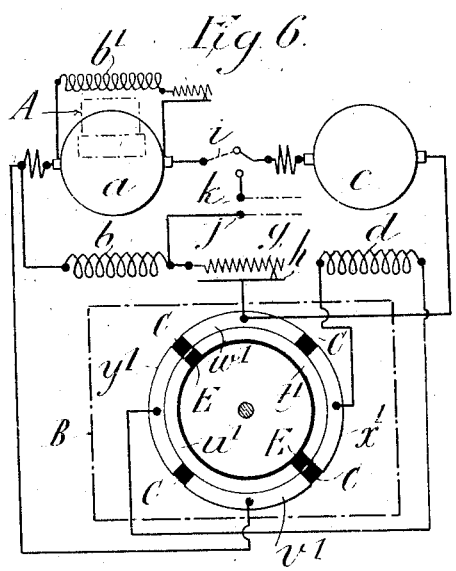

Patented Sept. 11, 1923.

1,467,958

UNITED STATES PATENT OFFICE.

WILLIAM ARTHUR STEVENS, OF MAIDSTONE, ENGLAND.

POWER-TRANSMISSION CONTROL.

Application filed October 4, 1921. Serial No. 505,231.

*To all whom it may concern:*

Be it known that I, WILLIAM ARTHUR STEVENS, a subject of the King of Great Britain and Ireland, residing at Maidstone, in the county of Kent, England, have invented Improvements in or Relating to Power-Transmission Controls, of which the following is a specification.

In the specification of my Letters Patent No. 1398656, there is described an electrical transmission arrangement, specially applicable for motor vehicles, comprising an electric generator driven by a prime mover for supplying current to a series wound electric motor, the generator being provided with shunt and series field windings of which the series winding can, by means of a circuit controller, be connected as a shunt to the motor series winding, and the current through the said generator series winding can be varied by a variable resistance from maximum to zero, according to the requirements of the electric motor, or according to the requirements of a lighting, welding or like circuit when the arrangement is used for lighting or welding purposes, the circuit controller being also adapted to reverse the direction of the current through the series field winding of the motor for forward and backward running.

Now the present invention has reference to improvements in electrical transmission arrangements of the kind referred to and it has for its principal object so to construct such an electrical transmission arrangement that the circuits through the armatures of the generator and motor will not at any time be broken by the circuit controller used in such an arrangement, and that movement of the controller from either its forward or backward position, for forward or backward running of the motor, to the central or neutral position, will short circuit the series field winding of the generator and also that of the motor.

For this purpose the circuit controller and its connections can be variously constructed and arranged.

In the accompanying illustrative drawings, Figs. 1, 2 and 3 are diagrammatic views showing an electrical transmission arrangement of the kind described in my aforesaid patent but embodying a modified construction of circuit controller for enabling the object of the present invention to be attained, the three figures showing the various parts of the apparatus in the forward running position, in the neutral or lighting position and in the reverse running position respectively. Figs. 4, 5 and 6 are diagrammatic views showing an electrical transmission arrangement of the kind referred to embodying another modified construction of circuit controller for enabling the object of the present invention to be attained, the circuit controller being shown in three different positions in the three figures.

Referring to Figs. 1, 2 and 3, $a$ is the electric generator, $b$ its series field winding and $b^1$ its shunt winding. $c$ is the electric motor and $d$ its series field winding. A is a prime mover for driving the electric generator. $g$ and $h$ are respectively the stationary and movable portions of a variable electrical resistance device. $t$ and $u$ are the insulated movable contacts, in the form of metal segments, and $v$, $w$, $x$ and $y$ the insulated stationary contacts, of a circuit controller of the type described and shown in my aforesaid patent but modified according to the present invention to enable the object thereof to be attained.

According to the present invention instead of making the segment $u$ to extend through an angular width of only about 150°, as before, whilst segment $t$ extends through an angular width of about 210°, it is made to extend through a greater angular width, say of about 210°, like segment $t$, so that in the central or neutral position of the controller, shown in Fig. 2, contacts $v$ and $w$ will bear against segment $t$ and contacts $x$ and $y$ will bear against segment $u$. As will be obvious, the segments $t$ and $u$ may be made of different angular widths to that mentioned so long as the condition mentioned, obtains. Contact $v$ which is connected to contact $y$, as before, is now connected to the positive pole of the electric generator $a$ and contact $w$, which is connected to contact $x$ and to the movable member $h$ of the variable resistance device $g$, $h$, as before is now connected to the negative pole of the electric motor $c$, the other poles of the generator and motor being arranged to be connected together, as through a change over switch $i$. Also, the segments $t$ and $u$ instead of being connected, the former to one pole, say the positive pole of the electric generator $a$ and the other to one pole, say the negative pole of the motor $c$, as in the former arrangements are respectively connected to the two ends of the series field winding $d$ of the electric motor. As will be seen the arrangement is such that when the circuit controller is in its said central or neutral and lighting position (Fig. 2), the stationary contacts $v$ and $w$ will bear on segment $t$, and the stationary contacts $x$ and $y$ will bear on segment $u$, with the result that the series field windings $b$ and $d$ of the electric generator $a$ and motor $c$ respectively are both short circuited, the variable resistance device $h$ $g$ being likewise short circuited with the winding $b$ and that when the controller is moved from either its forward running position (Fig. 1), or its rearward position (Fig. 3), for forward or rearward running of the motor respectively to its central or neutral position (Fig. 2) it will not break the circuit through the armatures of the generator and motor. The full line arrows show the direction of the current through the electric generator $a$, generator series field winding $b$, variable resistance $g$ $h$ and electric motor $c$. The dotted line arrows show the direction of the current through the generator $a$, motor series field winding $d$ and electric motor $c$.

In the modified construction of circuit controller shown in Figs. 4, 5 and 6, the four stationary insulated contacts are made as four circular metal segments $v^1$ $w^1$ $x^1$ and $y^1$, arranged concentrically to a common axis upon a base B with a cap C between the ends of adjacent segments, so that each segment is of an angular width of less than 90°. Associated with these stationary segments are two insulated movable circular metal contact segments $t^1$ and $u^1$ secured to a rotary carrier D, so as to be concentric to the same axis as the stationary contacts $v^1$, $w^1$, $x^1$ and $y^1$ and having a gap E between their adjacent ends so that each of them is of an angular width less than 180° but of greater angular width than each of the stationary segments. Segments $v^1$ and $w^1$ are arranged opposite to each other and connected respectively to the positive pole of the electric generator $a$ and the movable member $h$ of the variable resistance device the stationary member $g$ of which is connected to one end of the generator series winding $b$ the other end of which is connected to the said positive pole of the electric generator $a$, segment $w^1$ being also connected to one pole namely say the negative pole of the electric motor $c$ the other pole of which can be connected to the second pole of the generator $a$ by a change over switch $i$. Segments $x^1$ and $y^1$ are arranged opposite each other and connected to the respective ends of the motor series field winding $d$.

As will be seen the arrangement is such that in one position of the movable segments $t^1$ $u^1$ namely that shown in Fig. 4, segment $t^1$ connects segments $w^1$ and $y^1$ and segment $u^1$ connects segments $v^1$ and $x^1$, thus connecting the motor series field winding $d$ in series with the motor $c$ and in parallel with the generator series field winding $b$ for forward running of the motor. In another position of the two movable segments $t^1$ and $u^1$, namely that shown in Fig. 5, the generator series field winding $b$ and also the motor series field winding $d$, are both short circuited by the two movable segments $t^1$, $u^1$ bridging all the stationary segments $v^1$, $w^1$, $x^1$ and $y^1$. In a third position shown in Fig. 6 segment $t^1$ connects segments $w^1$ and $x^1$ and segment $u^1$ connects segments $v^1$ and $y^1$, so as again to connect the motor series winding $d$ in series with the motor $c$ but in the reverse direction, for reverse running, and in parallel with the generator series field winding $b$.

In each arrangement, when it is desired to adapt the same for supplying a lighting, welding or other circuit with current, two insulated terminals $j$ and $k$ are provided, one of them, namely $j$, being connected to the generator series field winding circuit between the winding $b$ and the variable resistance device $g$ $h$, as before, but the other $k$ being normally disconnected but arranged to be connected to the negative pole of the generator $a$ by the change over switch $i$ which at the same time opens the circuit between the generator $a$ and motor $c$.

What I claim is:—

1. In an electrical transmission arrangement of the kind herein referred to, comprising an electric generator having shunt and series field windings, a motor having a series field winding and a variable resistance device in series with the generator series field winding, a circuit controller comprising stationary and movable contacts and adapted in one position to effect forward running of the motor, in another position to effect reverse or backward running of the motor, and in an intermediate neutral position to short circuit the generator series field winding and resistance device and also to short circuit the motor series field winding, and to maintain the circuit through the armatures of the generator and motor unbroken when moving from either the forward or backward running position to the intermediate position.

2. In an electrical transmission arrangement of the kind herein referred to, comprising an electric generator having shunt and series field windings, an electric motor having a series field winding, and a variable resistance device in series with the generator series field winding, a circuit controller comprising movable and stationary contacts adapted in one position of the movable contacts to short circuit both the generator series field winding and also the motor series field winding, in another position of the said movable contacts to connect the generator series field winding in series with the motor and the motor field winding in parallel with the generator series field winding for forward running of the motor, and in a third position of the movable contacts to connect the generator series field winding in series with the motor, and the motor series field winding in parallel with the generator series field winding, but in the reverse direction, for reverse running of the motor, and in moving from one position to the other, to maintain the circuit of the generator and motor unbroken.

3. In an electrical transmission arrangement of the kind herein referred to, comprising an electric generator having a shunt and a series field winding, a motor having a series field winding and a variable resistance device in series with the generator series field winding, a circuit controller comprising four stationary segmental circular contacts $v^1$, $w^1$, $x^1$ and $y^1$ and two movable segmental circular contacts $t^1$ and $u^1$ adapted to bear against the stationary contacts, one stationary contact $v^1$ being connected to the positive pole of the generator, another stationary contact $w^1$ being connected to the negative pole of the motor and to one terminal of the resistance device the other terminal of which is connected to one terminal of the generator series field winding the other terminal of which is connected to the positive pole of the generator, two of said stationary contacts $x^1$ and $y^1$ being connected to the opposite terminals of the motor field winding, and said movable contacts $t^1$ and $u^1$ when moved into their mid position, respectively connecting three of said stationary contacts $w^1$, $x^1$, $y^1$ and two of the last mentioned contacts together with another stationary contact $v^1$, $x^1$, $y^1$, and when moved into a position to one side of the mid position, respectively connecting two each of said stationary contacts $w^1$, $y^1$ and $v^1$ $x^1$ so as to effect forward running of the motor, and when moved into a position to the other side of the mid position, respectively connecting another two each of said stationary contacts $w^1$ $x^1$ and $v^1$ $y^1$ so as to effect backward running of the motor.

4. In an electrical transmission arrangement of the kind herein referred to, comprising an electric generator having shunt and series field windings, a motor having a series field winding and a variable resistance device in series with the generator series field winding, a circuit controller comprising stationary and movable contacts and adapted in one position to effect forward running of the motor, in another position to effect reverse or backward running of the motor and in an intermediate neutral position to short circuit the generator series field winding and resistance device and also to short circuit the motor series field winding and to maintain the circuit through the armatures of the generator and motor unbroken when moving from either the forward or backward running position to the intermediate position, a pair of insulated terminals, one connected to the lead between the generator series field winding and the variable resistance and a switch adapted in one position to connect the armatures of the generator and motor in series and in another position to open the circuit between the generator and motor armature and connect the second terminal to the pole of the generator to which the motor was previously connected.

Signed at London, England, this 15th day of September, 1921.

WILLIAM ARTHUR STEVENS.